United States Patent
Barry

[15] 3,673,913
[45] July 4, 1972

[54] PANEL FASTENER WITH EXPANDABLE SLEEVE
[72] Inventor: John K. Barry, Springfield, Pa.
[73] Assignee: Southco, Inc., Lester, Pa.
[22] Filed: Sept. 4, 1970
[21] Appl. No.: 69,745

[52] U.S. Cl. ..............................................85/70
[51] Int. Cl. ......................................F16b 13/06
[58] Field of Search ..........................85/70; 24/221 R, 221 A

[56] References Cited

UNITED STATES PATENTS 3,279,302   10/1966   Modrey ........................................85/70
2,514,113   7/1950    Zahodiakin ..........................24/221 A Primary Examiner—Edward C. Allen
Attorney—Paul & Paul

[57] ABSTRACT

A second cam member has an axial clearance hole for receiving a T-shaped projection on 1 free end of a stud carrying a resilient sleeve radially expandable when axially compressed by axial displacement of a first cam member on the stud resulting from relative rotation between the cam members. The second cam member is also provided with notch means in its outer surface connected to the clearance hole by an internal helical ramp that operatively engages the projection upon rotation of the stud relative to the second cam member. Such relative rotation initially axially displaces both cam members and axially compresses the sleeve which exerts an opposite axial force on the cam members. Final relative rotation placing the stud in a predetermined angular position relative to the second cam member seats the projection in the notch means and keys the second cam member to the stud for rotation therewith. The residual axial force exerted by the sleeve maintains the projection seated in the notch means and develops a frictional force between the sleeve and first cam member that serves to prevent rotation therebetween.

1 Claim, 14 Drawing Figures

INVENTOR.
John K. Barry

BY

Paul & Paul
ATTORNEYS.

INVENTOR.
John K. Barry

BY

*Paul + Paul*

ATTORNEYS.

3,673,913

PANEL FASTENER WITH EXPANDABLE SLEEVE

BRIEF SUMMARY OF THE INVENTION

This invention relates to a panel fastener of the type employing a resilient sleeve which, in response to axial compression, is radially expandable into an aperture in a device to be fastened to the panel. The constriction of the walls of the aperture on the expanding sleeve causes the latter to bulge over the aperture thus frictionally and mechanically attaching the device to the panel.

Panel fasteners of the type described are disclosed in the prior art and include a headed stud forwardly inserted into a through-hole in a panel from one side thereof and a resilient sleeve mounted on the stud on the other side on the panel for capturing the latter against the head of the stud. Rotatably mounted and axially displaceable on the stud forwardly of the sleeve is a cam member that abuts the sleeve. At the free end of the stud is a cam actuator operatively engaging the cam member and keyed to the stud for rotation therewith. Relative rotation in one direction between the two members when the actuator member is held against forward axial displacement on the stud, imparts a rearward axial displacement to the cam member thereby axially compressing the sleeve against the panel causing the desired radial expansion of the sleeve. Such expansion is effective to secure a device to the panel.

In order to develop relative rotation between the two members when the stud is rotated, the cam member must be held by the panel against rotation. This result is achieved in the prior art by arranging for the sleeve to be slightly compressed when the members occupy a relative angular position at which the sleeve can be inserted into the aperture in the device to be secured to the panel. The resultant axial force from this precompression develops frictional forces between the panel and the sleeve and between the sleeve and the cam member, which frictional forces tend to hold the sleeve and the cam member stationary upon rotation of the stud relative to the panel. As a consequence of this expedient, the fastener can be operated from the side of the panel carrying the head of the stud, thus avoiding the necessity for the user to have access to the sleeve-side of the panel except to assembly the fastener to the panel.

Conventional panel fasteners of the type described are designed to be self-retained on a panel. Ideally, the cam actuator should be designed to be quickly and easily connected to the stud in order to facilitate attachment of the fastener to a panel; and it is the improvement in the cam actuator design and the manner in which the actuator is attached to the stud that constitutes the primary objects of the present invention.

Briefly, the invention contemplates a cam actuator in the form of a second cam member provided with a non-circular axial bore through which a T-shaped projection on the free end of the stud can be inserted when the stud has a first angular position relative to the second cam member. By holding the second cam member against rotation as the stud is rotated to a second predetermined angular position relative to the second cam member, the projection on the stud is made to overlie the free forward surface of the second cam member and seat into notch means provided in such surface for retaining the second cam member against forward axial movement on the stud. When the stud and second cam member are in such predetermined relative angular position, the first cam member causes the sleeve to be slightly axially compressed and to exert a forward axial pressure on the second cam member serving to securely seat the projection on the stud in the notch means and to key the second cam member to the stud for rotation therewith. Rotation of the stud relative to the panel will impart a corresponding rotation to the second cam member which acts against the first cam member and sleeve of the fastener in the conventional manner already described.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

BRIEF DESCRIPTION OF VIEWS OF THE DRAWING

For a more complete understanding of the nature and objects of the invention, reference should be had to the following detailed description taken in connection with the accompanying drawings wherein:

Referring now to FIG. 1, reference numeral 10 designates a panel fastener made in accordance with the present invention and suitable for releasably attaching apertured device 11 to apertured panel 12. Fastener 10 comprises stud 13, resilient sleeve 14, first or inner cam member 15, and second or outer cam member 16.

DETAILED DESCRIPTION OF THE INVENTION

Figure 1:
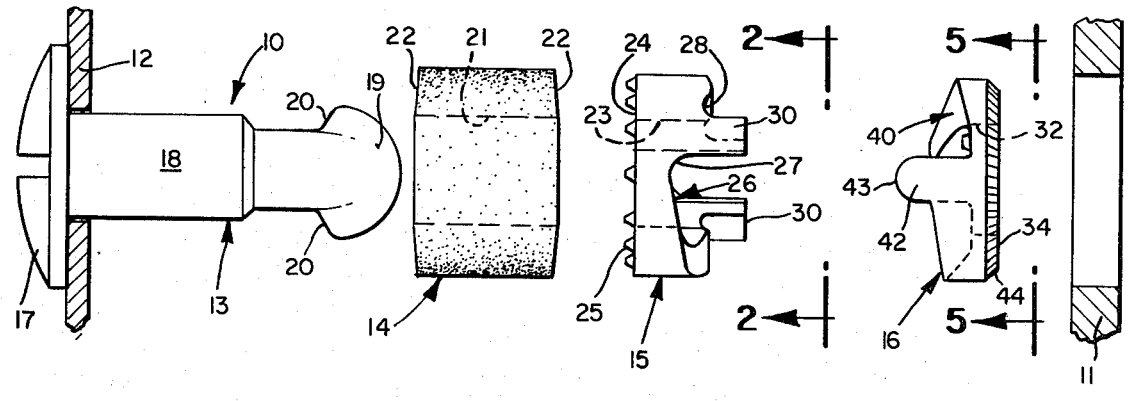
FIG. 1 is an exploded side view of a panel fastener made in accordance with the present invention.

Stud 13 has an enlarged slotted head 17 at one end, connected by shank 18 to enlarged, T-shaped projection 19 at the opposite free end of the stud. Projection 19 has a pair of rearwardly facing cam follower surfaces 20 projecting radially from the shank of the stud. While the stud is shown with a shouldered shank, a shank of uniform diameter could also be used. The actual diameter adjacent to the slotted head is related to the hole size in the panel.

Sleeve 14, which may be a Neoprene compound with a hardness of 43–48 on the Durometer "A" scale, is cylindrical in shape with a through-axial hole 21 sufficiently large to receive shank 18 of the stud. By reason of the resilient nature of the sleeve, axial compression will result in radial expansion. Each axial end of the sleeve is provided with a slightly conical end face 22.

Figure 2:
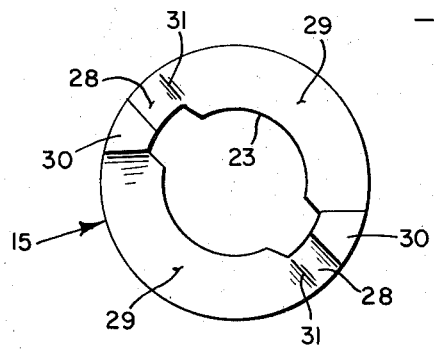
FIG. 2 is an end-view of the first cam member taken along the line 2—2 of FIG. 1.
Figure 5:
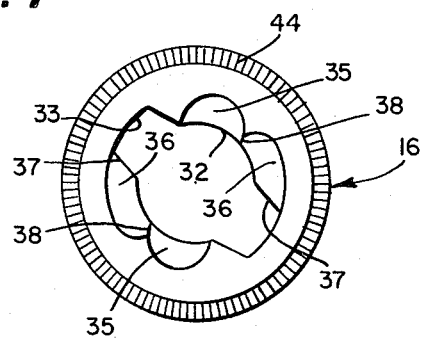
FIG. 5 is an end view of the second cam member taken along the line 5—5 of FIG. 1.
Figure 3:
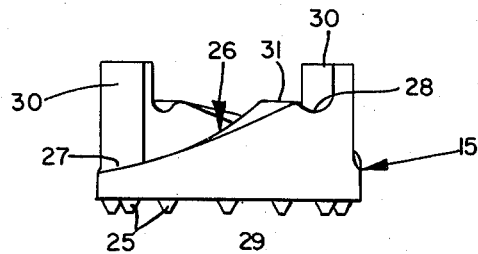
FIG. 3 is another side view of the first cam member.
Figure 6:
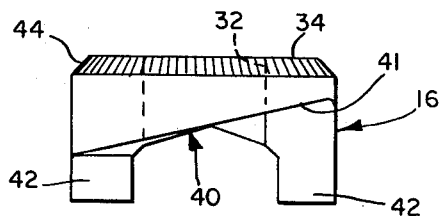
FIG. 6 is another side view of the second cam member.
Figure 4:
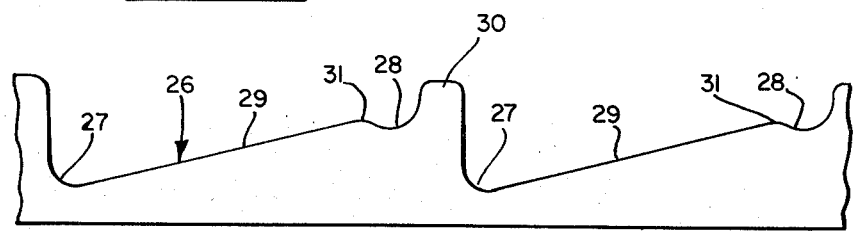
FIG. 4 is a development view of the cam surface of the first cam member.

First cam member 15 is essentially cylindrical and is provided with a circular through-axial hole 23 large enough to accommodate shank 18 of the stud so that member 15 can be freely rotatable and axially displaceable on shank 18 of the stud. Hole 23 may have opposed axial slots as shown in FIG. 2 to provide clearance for projection 19 of stud 13. Member 15 has a rearwardly facing generally flat axial end face 24 which may be provided with a plurality of projections 25 engageable with the forward conical end face 22 on sleeve 14 when the components are operatively assembled onto the stud. Projections 25 may be conical or frustro-conical in shape. Opposite face 24 is forwardly facing cam surface 26 whose development is shown in FIG. 4. Surface 26 has a pair of valleys 27 connected to a pair of peaks 28 by helical cam paths 29. Each peak 28 is defined by an axially extending rib 30, and detent means 31 is provided at the junction between peak 28 and path 29.

Figure 7:
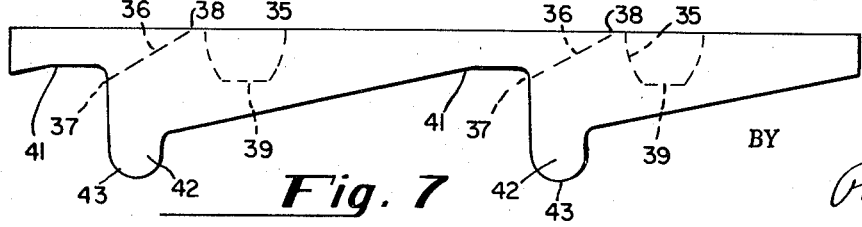
FIG. 7 is a development view of the second cam member.

Second cam member 16 is likewise essentially cylindrical and is provided with a through-axial hole 32 connecting with opposed axial slots 33 that clear projection 19 of stud 13 permitting axial insertion or removal of projection 19 when the stud has a first angular position relative to member 16. The forward free axial face 34 of member 16 is provided with a pair of opposed radially extending blind notches 35 whose orientation is a predetermined angle relative to the orientation of slots 33, preferably an angle of at least 90°. An internal helical cam rise 36 is provided in hole 32 connecting diametrically opposed rearward edges 37 of slots 33 with diametrically opposed regions 38 on face 34 adjacent notches 35. Region 38 is forward of the deepest part 39 of each notch 35. Opposite face 34 is rearwardly facing cam follower surface 40 whose development is shown in FIG. 7. Surface 40 has a pair of valleys 41 connected to a pair of peaks 42 having rounded free ends 43 adapted to engage cam surface 26 on first cam member 15, and to seat behind detent means 31. Finally, a circumferential serrated bevel 44 is provided on the forward end of member 16.

The assembly of the various components described above is shown in FIGS. 8–13 to which reference is now made. After the free end of stud 13 is inserted in the aperture in panel 12 so that slotted head 17 abuts one surface of the panel, sleeve 14 is passed over shank 18 until an end face 22 abuts the opposite surface of the panel thereby capturing the panel against the head of the stud. Next, first cam member 15 is passed over shank 18 until projections 25 on face 24 abut forward end face 22 of the sleeve.

Figure 8:
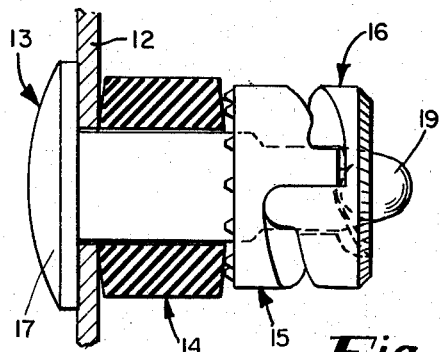
FIG. 8 is a side view of the components of the fastener preparatory to attachment of the second cam to the stud.
Figure 9:
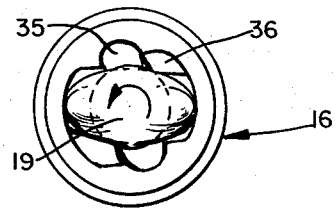
FIG. 9 is an end view of the device shown in FIG. 8.

With peaks 42 of cam member 16 directed toward the panel, member 16 is oriented with respect to stud 13 so that slots 33 are aligned with projection 19. In such first relative angular position, member 16 can be moved axially rearwardly over the projection. To facilitate this insertion, first cam member 15 is rotated on shank 18 until valleys 27 on member 15 are aligned with ends 43 on member 16 as shown in FIG. 8, and peaks 42 clear ribs 30. In such position, sleeve 14 will be essentially unstressed and cam follower surfaces 20 on stud 13 will be adjacent to rearward edges 37 of slots 33 in member 16 as shown in FIG. 8. Actually, some range of panel thicknesses can be accommodated for a given group of components, the limiting case being a panel so thick that considerable axial compression of the sleeve must be resorted to in order to engage surfaces 20 on the stud with helical path 36 on member 16. Such considerable axial compression will of course radially expand the sleeve to such a degree that it would not be practical to attempt to further radially expand it.

Figure 10:
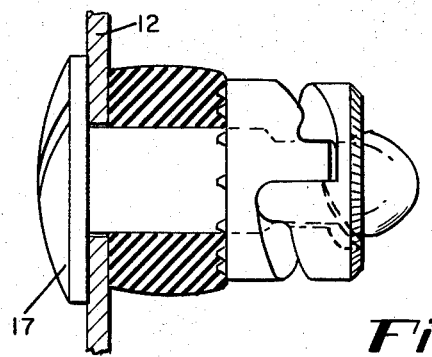
FIG. 10 is a side view of an intermediate step in attachment of the second cam to the stud.
Figure 11:
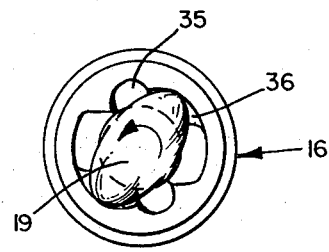
FIG. 11 is an end view of the device shown in FIG. 10.
Figure 12:
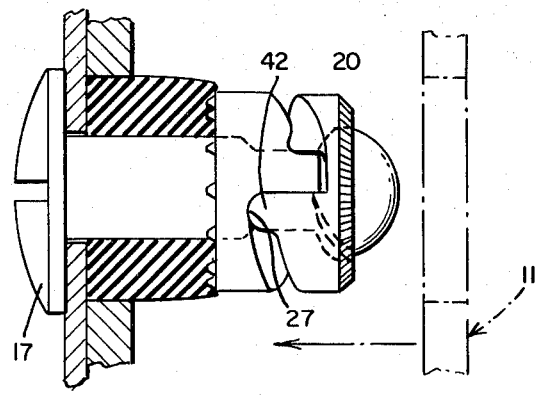
FIG. 12 is a side view of the assembled fastener showing it mounted in a panel.
Figure 13:
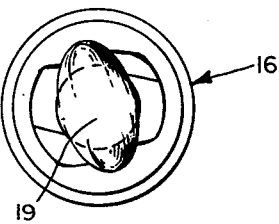
FIG. 13 is an end view of the assembly shown in FIG. 12.

By reason of serrated bevel 44, member 16 can be held by hand or with a tool (not shown) against rotation relative to the panel, for example, as a turning effort is applied to stud 13 by way of another tool (not shown) inserted into the slotted head 17. Upon initial rotation of stud 13 relative to member 16, surfaces 20 on projection 19 of the stud start to climb helical cam rises 36, imparting a rearward axial displacement to member 16 as shown in FIG. 10. Such displacement of member 16 also displaces member 15 because ends 43 of member 16 are seated in valley 27 of member 15. Projections 25 on the rear face 24 of member 15 bite into the forward conical face 22 of sleeve 14 and slightly axially compress the sleeve as shown in FIG. 10.

As rotation of stud 13 continues relative to member 16, each surface 20 eventually reaches region 38 adjacent notch 35, further compressing sleeve 14. At this point, the axial compression of the sleeve applies considerable forward axial thrust to members 15 and 16. Further rotation of stud 13 until it has a predetermined angular position relative to member 16 (see FIG. 12) causes projection 19 to seat in notches 35 as member 16 moves forwardly to engage region 39 in each notch with surfaces 20 on projection 19. Thus, projection 19 holds member 16 against the residual forward axial pressure exerted by sleeve 14 on member 16. The attachment of member 16 to the stud is now complete; and member 16 may be released. The assembled fastener is now ready to be used to attach device 11 to the panel.

The residual forward axial pressure exerted on member 16 holds projection 19 of the stud seated in notches 35 thus keying member 16 to the stud for rotation therewith. Such pressure also develops a frictional force between panel 12 and sleeve 14, and between the sleeve and first cam member 15, which force tends to hold the sleeve and the first cam member stationary upon rotation of the stud relative to the panel. When assembly of the fastener is complete, the residual axial compression of the sleeve is not sufficient to cause the resultant external radial expansion to be so great as to preclude insertion of the sleeve into the aperture in device 11.

Figure 14:
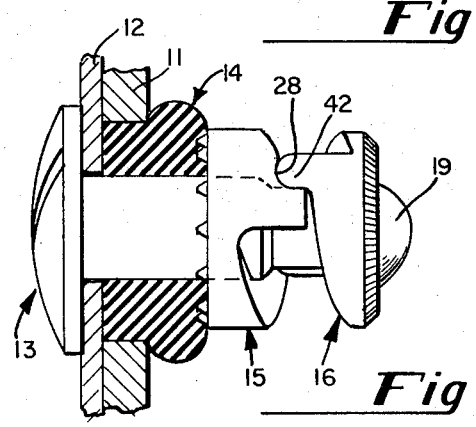
FIG. 14 is a side view of the fastener showing how it is used to attach a device to a panel.

Referring now to FIG. 14, panel fastener 10 is used to secure device 11 to panel 12 by first inserting the device onto the fastener and into abutment with the panel. Device 11 is representative of another panel, a closure, or any member to which a panel is to be secured. The only requirement is for the hole in the device to be large enough in diameter to accept sleeve 14 without significant interference when members 15 and 16 have a first relative position in which each peak 42 of member 16 is adjacent rib 30 and each rounded end 43 seats in valley 27. Of course, if device 11 has a blind hole, it must be deep enough to accept the free end of stud 13.

Rotation of stud 13 by applying a turning effort to slotted head 17 causes ends 43 of member 16 to ride up helical cam paths 29 of member 15 until ends 43 seat behind detents 31 and peak 42 abut ribs 30 (see FIG. 14). Cam member 16 at this point occupies a second angular position relative to cam member 15. Such position is stable because the forward force exerted by the sleeve on member 15 seats ends 43 behind detent 31. A definite torque must be applied to stud 13 to cause ends 43 to ride up and out of detents 31.

The above described rotation of the cam members to their second angular position imparts a rearward axial displacement to member 15 which axially compresses sleeve 14 and causes radial expansion of the sleeve into the constriction defined by the walls of the aperture in device 11. Such expansion frictionally engages the walls; and, where the thickness of device 11 is less than the length of the sleeve, the projecting portion of the sleeve is bulged outwardly to overlap the aperture in the panel as shown in FIG. 14. The fastener thus frictionally as well as mechanically attaches the device to the panel.

Proper operation is assured when hole 21 in sleeve 14 is large enough to permit the inner walls defining hole 21 to clear shank 18 when the cam members are in their second angular position and maximum radial expansion of the sleeve has occurred. This arrangement prevents frictional engagement of the shank with the sleeve while the stud is being turned. Conical end faces 22 assure proper operation because the wall of hole 21 is bowed outwardly away from shank 18 as the sleeve is initially compressed.

From the above description, those skilled in the art will appreciate that the fastener of the present invention has component parts well suited to high-speed mass production. For example, the stud can be entirely manufactured by high-speed cold forming processes and requires no secondary shank slotting and/or drilling operations to accommodate the second cam member. Furthermore, the design of the cooperating means between the shank and the second cam member permits one component to be attached to the other by simple rotary movement affording rapid hand installation as well as easy automatic installation as the situation requires.

What is claimed is:

1. A panel fastener comprising:
   a. an axially extending headed stud having a shank portion adapted to be forwardly inserted into a through-hole in a panel, and a T-shaped portion on the free end of said shank portion having a pair of rearwardly facing cam follower surfaces projecting radially from said shank portion;
b. a resilient sleeve on said stud radially expandable in response to rearward axial compression;
c. a first cam member rotatable and axially displaceable on said stud forwardly of said sleeve and in engagement therewith and having a forwardly facing cam surface; and
d. a second cam member on said stud forward of said first cam member and having a cam follower surface facing and engaging the cam surface on said first cam member; the cam surface and cam follower surface of said cam members comprising means being constructed and arranged so that rotation of said second cam member relative to said first cam member imparts rearward axial movement to said first cam member on said stud to thereby rearwardly axially compress said sleeve when said second cam member is held against forward axial movement; said second cam member having an axial clearance hole comprising a substantially cylindrical portion having a diameter less than the combined radial projection of said T-shaped portion of said stud and greater than the shank portion of said stud, and opposed axial slots that clear the radial projection of said T-shaped portion of said stud thereby permitting axial insertion of said second cam member over the free end of said stud; said opposed axial slots having surfaces intersecting opposed internal cam surfaces at diametrically opposed rearward edges in said second cam member and extending radially outwardly from said cylindrical portion of said clearance hole, said internal cam surfaces progressing forwardly helically and being adapted to cooperate with the follower surfaces of said T-shaped portion of said stud to provide cam action; the forward free face of said second cam member having a pair of opposed radially extending, axially blind notches formed by surfaces intersecting the internal cam surfaces at edges forward of the axially rearwardly deepest part of said notches;
e. said stud, sleeve, and cam members cooperating to provide a means for holding said second cam member against forward axial movement on said stud when the parts have been assembled as aforesaid and the stud has been rotated axially with respect to said second cam member so that the cam follower surfaces projecting from said T-shaped portion of said stud have traveled along the helical surfaces on said second cam member and are lodged in said notches.

* * * * *